United States Patent
Rigby et al.

(10) Patent No.: US 7,740,583 B2
(45) Date of Patent: *Jun. 22, 2010

(54) TIME DELAY ESTIMATION METHOD AND SYSTEM FOR USE IN ULTRASOUND IMAGING

(75) Inventors: Kenneth Wayne Rigby, Clifton Park, NY (US); Steven Charles Miller, Pewaukee, WI (US)

(73) Assignee: General Electric Company, Niskayuna, NY (US)

( * ) Notice: Subject to any disclaimer, the term of this patent is extended or adjusted under 35 U.S.C. 154(b) by 1331 days.

This patent is subject to a terminal disclaimer.

(21) Appl. No.: 10/882,910

(22) Filed: Jun. 30, 2004

(65) Prior Publication Data

US 2006/0004287 A1    Jan. 5, 2006

(51) Int. Cl.
*A61B 8/00* (2006.01)
(52) U.S. Cl. .................... 600/437; 73/596
(58) Field of Classification Search .................. 600/441, 600/472, 459; 73/597, 599; 367/162
See application file for complete search history.

(56) References Cited

U.S. PATENT DOCUMENTS

| | | | |
|---|---|---|---|
| 4,835,689 A * | 5/1989 | O'Donnell | 250/580 |
| 4,837,578 A * | 6/1989 | Gammell | 342/194 |
| 4,937,775 A * | 6/1990 | Engeler et al. | 708/422 |
| 4,989,143 A * | 1/1991 | O'Donnell et al. | 600/437 |
| 5,268,876 A * | 12/1993 | Rachlin | 367/7 |
| 5,388,461 A * | 2/1995 | Rigby | 73/597 |
| 5,423,318 A | 6/1995 | Li et al. | |
| 5,570,691 A * | 11/1996 | Wright et al. | 600/447 |
| 6,023,977 A | 2/2000 | Langdon et al. | |
| 2002/0002333 A1* | 1/2002 | Angelsen et al. | 600/443 |
| 2003/0018442 A1* | 1/2003 | Yamaguchi et al. | 702/69 |
| 2005/0148874 A1 | 7/2005 | Brock-Fisher et al. | |

* cited by examiner

*Primary Examiner*—Brian Casler
*Assistant Examiner*—Parikha S Mehta
(74) *Attorney, Agent, or Firm*—Jason K. Klindtworth

(57) ABSTRACT

A method for correcting a time delay between at least two signals in ultrasound systems is provided. The ultrasound system comprises a beamformer processor comprising a summer coupled to the transducer array and configured for performing a complex operation on a first plurality of receive signals to generate a beamsum signal; wherein each of the receive signals comprise a corresponding beamforming delay and a complex filter coupled to the summer and configured to transform the beamsum signal to an analytical signal. The beamformer processor further comprises a plurality of correlator processors coupled to at least one respective transducer element and the complex filter, each correlator processor configured to calculate a correlation sum for at least one receive signal and at least one time delay estimator adapted to receive the correlation sum of at least one receive signal and configured to estimate the corresponding time delay using the correlation sum.

22 Claims, 4 Drawing Sheets

TIME DELAY ESTIMATION METHOD AND SYSTEM FOR USE IN ULTRASOUND IMAGING

BACKGROUND

The invention relates generally to imaging systems and more specifically to a method and system for estimating and correcting time delays in an ultrasound imaging system.

Ultrasound systems comprise an array of transducer elements used for transmitting a set of waveforms into an imaging subject and for receiving a set of reflected ultrasound signals. Each waveform is emitted with a relative time delay chosen to focus the net transmitted waveform in a desired direction and depth and with a desired shape. Similarly each received signal is individually delayed to maximize the response of the system to reflected energy for a desired direction and depth and with a desired shape. The delayed receive signals are summed and processed to create and display an image of the imaging subject.

The transmit and receive time delays, known collectively as beamforming time delays, are typically calculated assuming that sound propagates through the body with a known, constant speed. When this assumption fails, the transmit and receive focusing is degraded and there will be a loss of image resolution and contrast.

One way to reduce this loss of image quality is to adjust the beamforming time delays based on measurements of the relative time delays of the receive signals. It is convenient to measure these relative time delays after the receive beamforming delays have been applied to them. If the assumption of a known, fixed sound speed is correct, the delayed receive signals will be well-aligned in time, i.e., the arrival time errors will be small. If the assumption is not correct, the delayed receive signals will not be well-aligned in time; the arrival time errors will be large. By adjusting the beamforming delays for the arrival time errors, the focusing will be improved and image resolution and contrast will increase.

In medical ultrasound imaging, the estimation of arrival time errors must be fast, accurate and robust. It is also very desirable that the extra cost required to implement the estimation hardware be minimized.

A fast estimation is desired because the beamforming corrections need to be updated quickly since the required corrections will vary as the transducer moves, either as the operator moves the probe over the patient as part of the normal scanning procedure, or due to slight movement of the operator's hand or because of patient motion or breathing.

An accurate estimation is desired to improve image resolution and contrast and to avoid undesirable degradation of the image due to the adjustment of beamforming time delays by incorrect time delay estimates. Beamforming time delay errors typically introduce artifacts into the image which may lead to incorrect diagnosis or a longer examination time. The rate of artifact production must be sufficiently low for the majority of operators to routinely use the time delay correction feature and thereby gain the benefit of improved image resolution and contrast.

The Fourier spectrum of a real signal with a bandwidth which is not too large (as is typical for ultrasound signals) consists of two relatively isolated regions of non-negligible amplitude, known more commonly as bands. One of these bands is centered around a positive frequency known as the "carrier" frequency, and the other band is centered around a negative frequency which is the opposite of the carrier frequency. There are many methods of producing the baseband signal corresponding to a real signal but the desired net effect is to suppress the negative frequency band and to shift the positive frequency band in frequency such that it is approximately centered at zero frequency. Note that the baseband signal is complex.

A related signal to the baseband signal is the analytic signal. Mathematically, the analytic signal is derived from a real signal by removing its negative frequency components. In practical systems, the negative frequency components are suppressed, but not totally eliminated, by filtering. The analytic signal differs from the baseband signal in that the positive frequency spectral band is not shifted down in frequency such that it becomes centered at zero frequency.

One method to estimate time delays between two real signals requires converting both signals to their complex baseband form. The complex conjugate of one baseband signal is multiplied sample by sample with the other baseband signal and then summed. The phase of the resulting complex number is proportional to the time delay error between the two signals. One problem with the above method is the requirement for converting both real signals to complex form. Converting signals to their baseband form requires large and expensive filters. Since this method requires converting each receive signal to its baseband form, it is undesirably costly. It is helpful to consider the above method as follows. Let $S_{B0}(t)$ and $S_{B1}(t)$ be two baseband signals, each a function of time t. For simplicity, t is considered to be a continuous variable. In practice, the signals are sampled over a set of evenly spaced time intervals, $t[i]=i\Delta t$, where $\Delta t$ is the sampling time interval.

The method described above constructs a complex correlation sum 'C' by integrating the product of one baseband signal with the complex conjugate of the other baseband signal as shown in the equation below.

$$C=\int_{-\infty}^{+\infty}dt S^*_{B0}(t)S_{B1}(t) \qquad \text{Equation (1)}$$

As is well-known, however, the integral over time (as in equation 1) can also be expressed as the integral over frequency of the spectra of the two signals:

$$C=\int_{-\infty}^{+\infty}dt S^*_{B0}(t)S_{B1}(t)=\int_{-\infty}^{+\infty}df A^*_{B0}(f)A_{B1}(f) \qquad \text{Equation (2)}$$

In Eq. (2), $A_{B1}(f)$ is the Fourier transform of the baseband signal $S_{B1}(t)$, and $A^*_{B0}(f)$ is the complex conjugate of the Fourier transform of the baseband signal $S_{B0}(t)$.

The above described method of estimating time delay is usually accurate when the signals which are compared are produced by relatively uniform random scatterers. An example of this in the human body is a region of the liver without bright arterial walls and without large, nearly anechoic, blood vessels. In practice, such a region of uniform scatterers is not always available. As a result, the time-delay estimates can be corrupted, especially when there are strongly reflecting scatterers which are not aligned with the desired scan direction. A strongly reflecting, off-axis scatterer produces a signal at the transducer with an arrival time error which varies approximately linearly across the array. If such a signal were used to estimate the time delay error, then correcting the observed arrival time errors would erroneously steer the beamformer toward the scatterer.

Therefore there is a need for a method and system in ultrasound systems to accurately estimate time delays while minimizing the cost and size of the system.

BRIEF DESCRIPTION

Briefly, in accordance with one aspect of the invention, a method for correcting the beamforming time delays between at least two receive signals acquired in an ultrasound system is provided. The method comprises summing at least two receive signals to form a reference signal, calculating the analytic signal corresponding to the reference signal, and estimating the time delay error for each receive signal by comparing the analytic signal and the corresponding receive signal. The method further comprises correcting the beamforming time delays using the estimated time delay errors.

In another embodiment, an ultrasound system for correcting a time delay is provided. The ultrasound system comprises a transducer array having a set of array elements disposed in a pattern, each of the elements being separately operable to produce a pulse of ultrasound energy during a transmission mode and to produce an echo signal in response to vibratory energy impinging an imaging object during a receive mode. The ultrasound system further comprises a transmitter coupled to the transducer array and being operable during the transmission mode to apply a separate transmit signal pulse with a respective transmitter time delay to each of the array elements such that a directed transmit beam is produced and a receiver coupled to the transducer array and being operable during the receive mode to sample the echo signal produced by each of the array elements as the vibratory energy impinges the imaging object and to impose a separate respective receiver time delay on each said echo signal sample to generate a corresponding first plurality of receive signals during a first acquisition cycle. The ultrasound system also includes a beamformer processor comprising a summer coupled to the transducer array and configured to sum at least two receive signals for generating a reference signal. Each of the receive signals includes a corresponding receiver time delay. The beamformer processor further comprises a complex filter coupled to the summer and configured to transform the beamsum signal to an analytic signal and a plurality of correlator processors each coupled to at least one respective transducer element and the complex filter, each correlator processor configured to estimate a time delay by comparing the analytic signal and each real signal corresponding to each of the receive signals. The beamformer processor is further configured to correct the transmit and receive beamforming time delays for each transducer element corresponding to each of the receive signals.

In another embodiment, an ultrasound system for estimating beamforming time delay is provided. The ultrasound system comprising a transducer array having a set of array elements disposed in a pattern, each of the elements being separately operable to produce a pulse of ultrasound energy during a transmission mode and to produce an echo signal in response to vibratory energy impinging an imaging object during a receive mode. The ultrasound system further comprises a transmitter coupled to the transducer array and being operable during the transmission mode to apply a separate transmit signal pulse with a respective transmitter time delay to each of the array elements such that a directed transmit beam is produced. A receiver coupled to the transducer array and being operable during the receive mode to sample the echo signal produced by each of the array elements as the vibratory energy impinges the imaging object and to impose a separate respective receiver time delay on each said echo signal sample to generate a corresponding plurality of receive signals. The system further comprises a beamformer processor configured to calculate an amplitude of each sample corresponding to each receive signal, and the sum of the amplitudes of the receive signals for a set of sample; wherein the beamformer processor is further configured to estimate a time delay between the two receive signals by comparing a beamsum signal to a receive signal and wherein the beamformer processor is further configured to correct the beamforming time delays for each transducer element corresponding to each of the receive signals.

In another embodiment, a system for correcting a time delay between at least two receive signals acquired in an ultrasound system is provided. The system comprises means for summing at least two receive signals to form a reference signal and means for calculating the analytic signal corresponding to the reference signal. The system further comprises means for estimating the time delay error for each receive signal by comparing the analytic signal and the corresponding receive signal and means for correcting the beamforming time delays using the estimated time delay errors.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
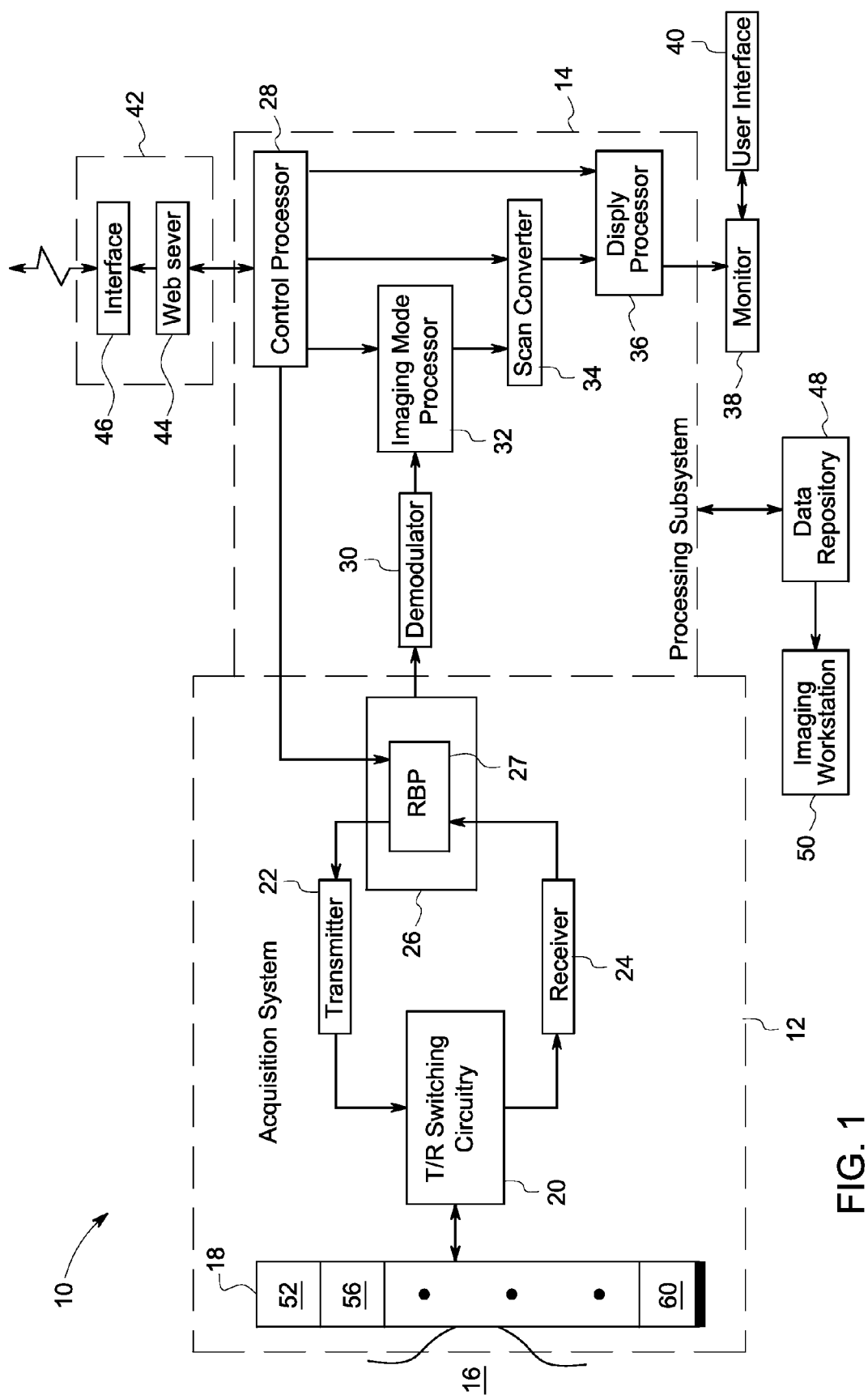
FIG. 1 is a block diagram of an ultrasound system implemented according to one aspect of the invention.

FIG. 1 is a block diagram of an embodiment of an ultrasound system 10 implemented in accordance with one aspect of the invention. The ultrasound system comprises acquisition subsystem 12 and processing subsystem 14. The acquisition subsystem 12 comprises a transducer array 18 (comprising a plurality of transducer array elements), transmit/receive switching circuitry 20, a transmitter 22, a receiver 24, and a beamformer 26. Beamformer 26 includes a receive beamformer processor (RBP) 27. Processing subsystem 14 comprises a control processor 28, a demodulator 30, an imaging mode processor 32, a scan converter 34 and a display processor 36. The display processor is further coupled to a monitor 38 for displaying images. User interface 40 interacts with the control processor and the display monitor. The processing subsystem may also be coupled to a remote connectivity subsystem 42 comprising a web server 44 and a remote connectivity interface 46. Processing subsystem may be further coupled to data repository 48 to receive ultrasound image data. The data repository interacts with imaging workstation 50.

As used herein, "adapted to", "configured" and the like refer to mechanical or structural connections between elements to allow the elements to cooperate to provide a described effect; these terms also refer to operation capabilities of electrical elements such as analog or digital computers or application specific devices (such as an application specific integrated circuit (ASIC)) that are programmed to provide an output in response to given input signals.

The architectures and modules may be dedicated hardware elements such as circuit boards with digital signal processors or may be software running on a general purpose computer or processor such as a commercial, off-the-shelf PC. The various architectures and modules may be combined or separated according to various embodiments of the invention.

In the acquisition subsystem 12, the transducer array 18 is in contact with subject 16. The transducer array is coupled to the transmit/receive (T/R) switching circuitry 20. The T/R switching circuitry 20 is coupled to the output of transmitter 22 and the input of receiver 24. The output of receiver 24 is an input to beamformer 26. Beamformer 26 is further coupled to the input of transmitter 22, and to the input of demodulator 30.

In processing subsystem 14, the output of demodulator 30 is coupled to an input of imaging mode processor 32. Control processor 28 interfaces to imaging mode processor 32, scan converter 34 and to display processor 36. An output of imaging mode processor 32 is coupled to an input of scan converter 34. An output of scan converter 34 is coupled to an input of display processor 36. The output of display processor 36 is coupled to monitor 38.

Ultrasound system 10 transmits ultrasound energy into subject 16 and receives and processes backscattered echo signals from the subject to create and display an image. To generate a transmitted beam of ultrasound energy, the control processor 28 sends command data to the beamformer 26 to generate transmit parameters to create a beam of a desired shape originating from a certain point at the surface of the transducer array 18 at a desired steering angle. The transmit parameters are sent from the beamformer 26 to the transmitter 22. The transmitter 22 uses the transmit parameters to properly encode transmit signals to be sent to the transducer array 18 through the T/R switching circuitry 20. The transmit signals are set at certain levels and time delays with respect to each other and are provided to individual transducer elements of the transducer array 18. The transmit signals excite the transducer elements to emit ultrasound waves with the same time delay and level relationships. As a result, a transmitted beam of ultrasound energy is formed in a subject within a scan plane along a scan line when the transducer array 18 is acoustically coupled to the subject by using, for example, ultrasound gel. The process is known as electronic scanning.

The transducer array 18 is a two-way transducer. When ultrasound waves are transmitted into a subject, the ultrasound waves are backscattered off the tissue and blood samples within the subject. The transducer array 18 receives the backscattered echo signals at different times, depending on the distance into the tissue from which they return and the angle with respect to the surface of the transducer array 18 at which they return. The transducer elements are responsive to the backscattered echo signals and convert the ultrasound energy from the backscattered echo signals into electrical signals.

The receive electrical signals are routed through the T/R switching circuitry 20 to the receiver 24. The receiver 24 amplifies and digitizes the receive signals and provides other functions such as gain compensation. The digitized receive signals correspond to the backscattered waves received by each transducer element at various times and preserve the amplitude and arrival time information of the backscattered waves.

The digitized received signals are sent to beamformer 26. The control processor 28 sends command data to beamformer 26. Beamformer 26 uses the command data to form a receive beam originating from a point on the surface of transducer array 18 at a steering angle typically corresponding to the point and steering angle of the previous ultrasound beam transmitted along a scan line.

The beamformer 26 operates on the appropriate received signals by performing time delaying and summing, according to the instructions of the command data from the control processor 28, to create received beam signals corresponding to sample volumes along a scan line in the scan plane within the subject.

The received beam signals are sent to processing subsystem 14. Demodulator 30 demodulates the received beam signals to create pairs of I and Q demodulated data values corresponding to sample volumes within the scan plane.

The demodulated data is transferred to imaging mode processor 32. Imaging mode processor 32 uses parameter estimation techniques to generate imaging parameter values from the demodulated data in scan sequence format. The imaging parameters may comprise parameters corresponding to various possible imaging modes such as, for example, B-mode, color velocity mode, spectral Doppler mode, and tissue velocity imaging mode. The imaging parameter values are passed to scan converter 34. Scan converter 34 processes the parameter data by performing a translation from scan sequence format to display format. The translation includes performing interpolation operations on the parameter data to create display pixel data in the display format.

The scan converted pixel data is sent to display processor 36 to perform any final spatial or temporal filtering of the scan converted pixel data, to apply grayscale or color to the scan converted pixel data, and to convert the digital pixel data to analog data for display on monitor 38. The user interlace 40 interacts with the beamformer processor 27 based on the data displayed on monitor 38.

As described earlier, receive beamformer processor 27 performs time delaying operations on the receive signals. The manner in which the receive beamformer processor estimates and corrects the time delay error in the receive signals is described in further detail below with reference to FIG. 2.

Figure 2:
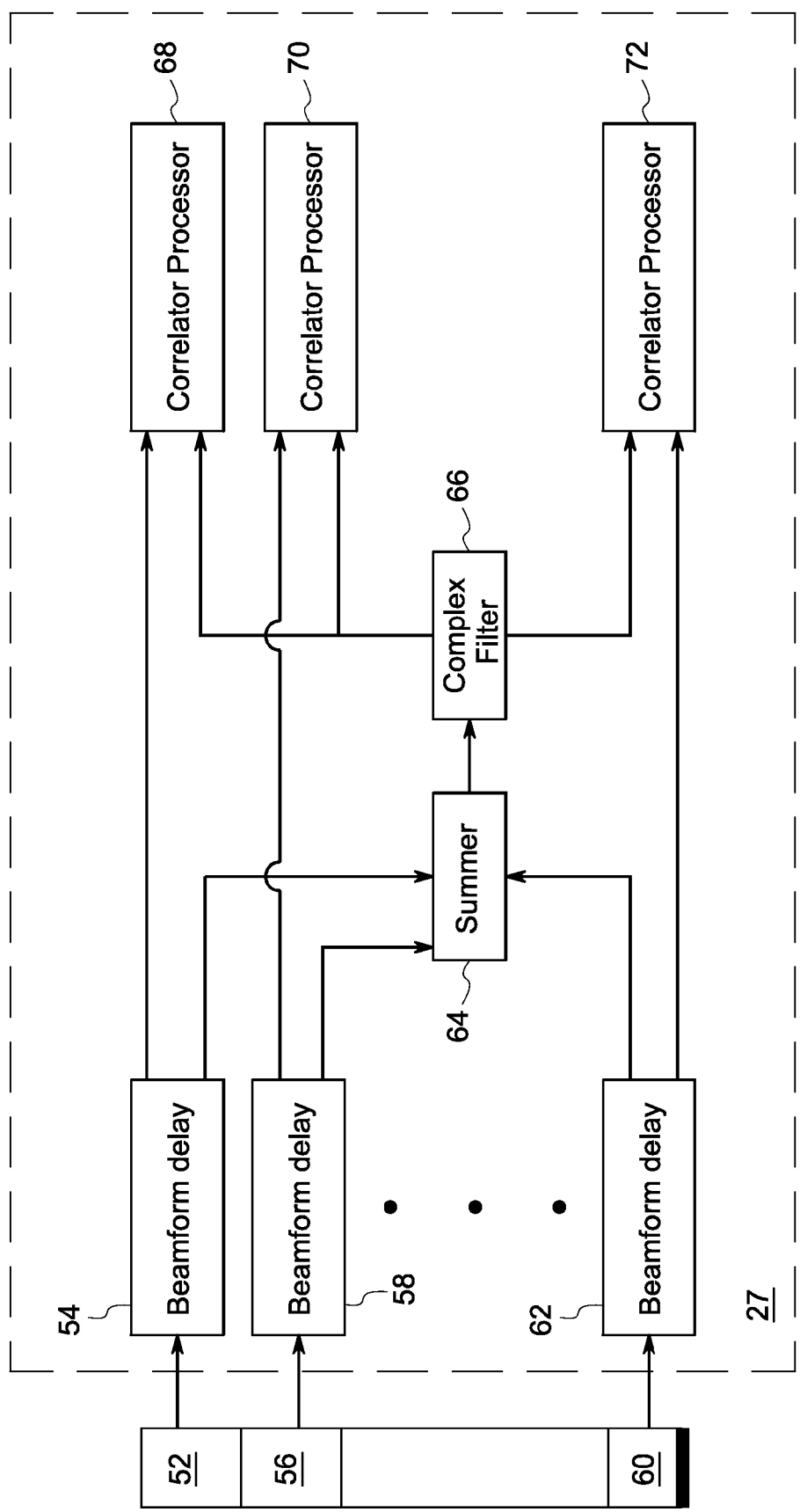
FIG. 2 is a block diagram of one embodiment of a beamformer processor according to one aspect of the invention.

FIG. 2 is a block diagram of one embodiment of a receive beamformer processor 27. FIG. 2 is one method by which receive beamformer processor 27 estimates time delays. The beamformer processor is shown receiving signals from transducer elements 52, 56 and 60 of transducer array 18. Each block in the beamformer processor is described in further detail below.

Beamforming delay 54 introduces a delay in the receive signal from transducer element 52. The delayed signal from transducer element 52 is provided to correlator processor 68. Similarly, beamforming delays 58 and 62 introduce delays in the receive signals from transducer elements 56 and 60. The delayed signals from transducer elements 56 and 60 are provided to correlator processors 70 and 72, respectively.

The delayed receive signals from all transducer elements are also provided to summer 64 which sums the delayed receive signals from beamforming delays 54, 58 and 62 to form the beamsum signal. The beamsum signal is provided to complex filter 66, which suppresses its negative frequency components to produce the analytic signal form of the beamsum signal. The number of bits in the analytic signal may be reduced from the number of bits in the beamsum signal based on a desired complexity and a desired accuracy of the correlator processor. The complex analytic signal is provided to correlator processors 68, 70 and 72 as shown in FIG. 2.

Continuing with FIG. 2, correlator processors 68, 70 and 72 each receive two signals, namely the delayed receive signals from beamforming delays 54, 58 and 62, as well as the analytic signal from complex filter 66. The number of bits in the receive signal input to the correlator may be reduced from the number of bits input to the summer 64 based on a desired complexity and a desired accuracy of the correlator processor. Correlator processors 68, 70 and 72 are configured to calculate a correlation sum for the corresponding delayed receive signal from beamforming delays 54, 58 and 62.

From equation 2, it can be seen that the value of the integral will be unchanged if we suppress the negative frequency band in only one of the signals in the integrand. Furthermore, there is no need to shift the positive frequency bands to center them at zero frequency. Thus, the correlation sum can be calculated using the following equation:

$$C = \int_{-\infty}^{+\infty} df A^*_{A0}(f) A_1(f) \qquad \text{Equation (3)}$$

where $A^*_{A0}(f)$ is the complex conjugate of a Fourier transform of the analytic signal $S_{A0}(t)$, and $A_1(f)$ is the Fourier transform of the real signal, $S_1(t)$. Finally, using the equivalence, equation 2, which relates the integral over time of the product of two signals to the integral over frequency of the product of their spectra, equation 3 may be represented as:

$$C = \int_{-\infty}^{+\infty} dt S^*_{A0}(t) S_1(t) \qquad \text{Equation (4)}$$

The equality of equations 3 and 4 generally applies when the integration is over infinite limits. In practice, the integration is over a finite time interval and the sampling in time is discrete. Thus, the correlation sum is calculated based on the equation given by:

$$C = \sum_{i=i_o}^{i_1} S^*_{A0}[i] S_1[i] \qquad \text{Equation (5)}$$

where C represents the correlation sum, $S^*_{A0}[i]$ represents the complex conjugate of the analytic signal, $S_1[i]$ represents the real signal, and i represents a time sample index. The sum is calculated over time samples i0 to i1, which are typically chosen to span several transmit waveform lengths centered over the transmit focus range.

Figure 3:
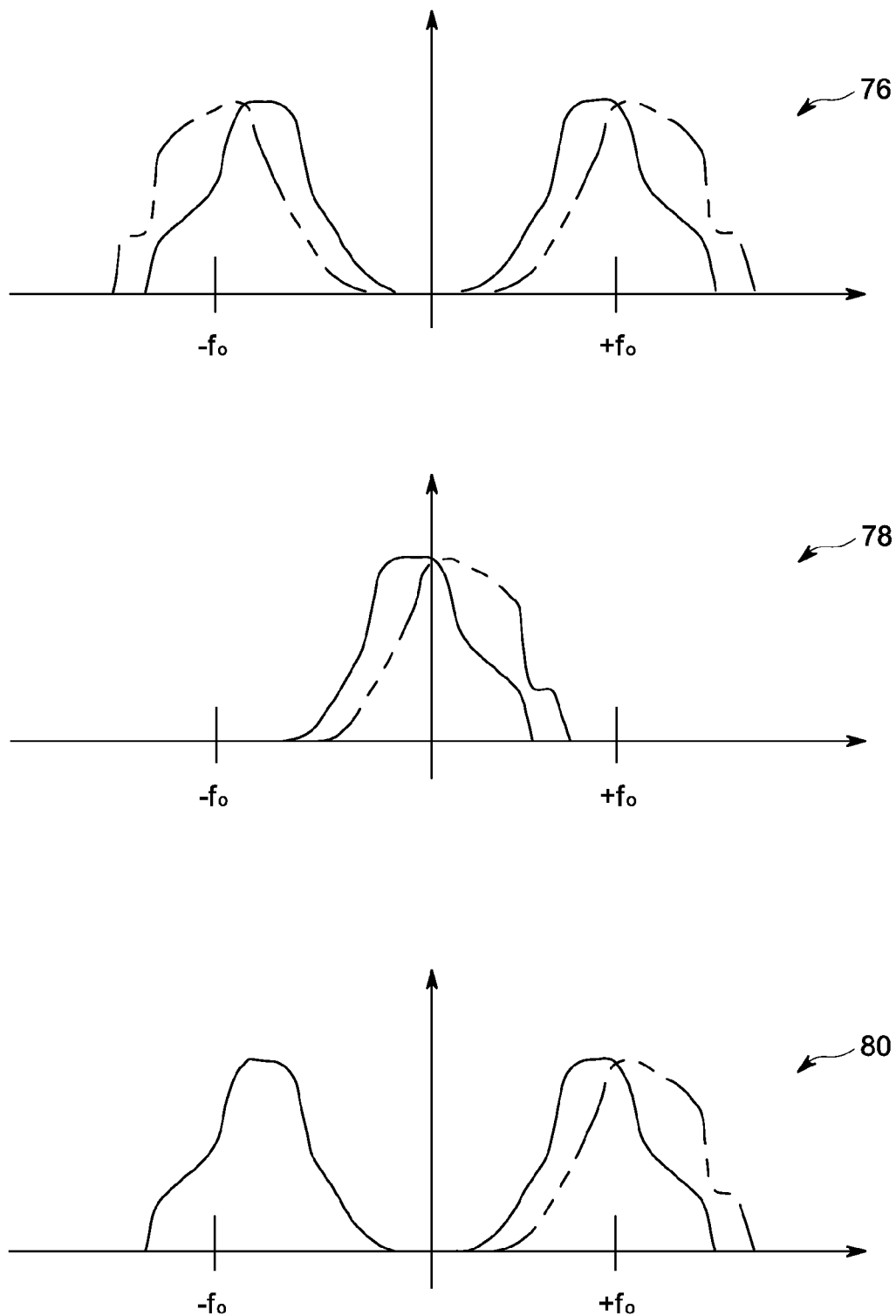
FIG. 3 is a graph illustrating the frequency spectra of two real signals, two baseband signals, and of one real and one analytic signal.

Reference numeral 76 in FIG. 3 shows representative spectra of two real signals. For simplicity only the real part of the frequency components are displayed in the figure. The last integral in Equation 2 is represented by reference numeral 78, which shows representative spectra of two baseband signals. Reference numeral 80, which shows representative spectra of a real signal (solid line) and an analytic signal (dashed line) represents the integral in Equation 3. From the FIG. 3, reference numerals 78 and 80, it is easy to note that the last integral in Equation 2 and the integral in Equation 3 give the same result, i.e., that the negative frequency band need be suppressed in only one of the signals in the integrand. Furthermore, there is no need to shift the positive frequency bands to center at zero frequency.

As is seen from the equation 5, the invention requires only one signal to be converted to a complex form. In addition, converting the reference signal to its analytic form avoids an additional step of shifting the frequency spectrum of the reference signal to produce its baseband form.

In practical implementations processing delay is introduced in the summing and complex filtering steps which produce the reference signal. Since corresponding range samples from the reference and receive signals are multiplied together in the correlator processor, the receive signal is delayed correspondingly so that the reference and receive signals are properly aligned.

The correlator processor is further configured to estimate the time delay error of each delayed received signal received from beamforming delays 54, 58 and 62, using the correlation sum. In one embodiment, the time delay error is estimated by calculating the phase of the correlation sum and converting it to a time delay by multiplying it by a scale factor, $2\pi/f0$, where f0 is the approximate center frequency of the ultrasound signals.

Figure 4:
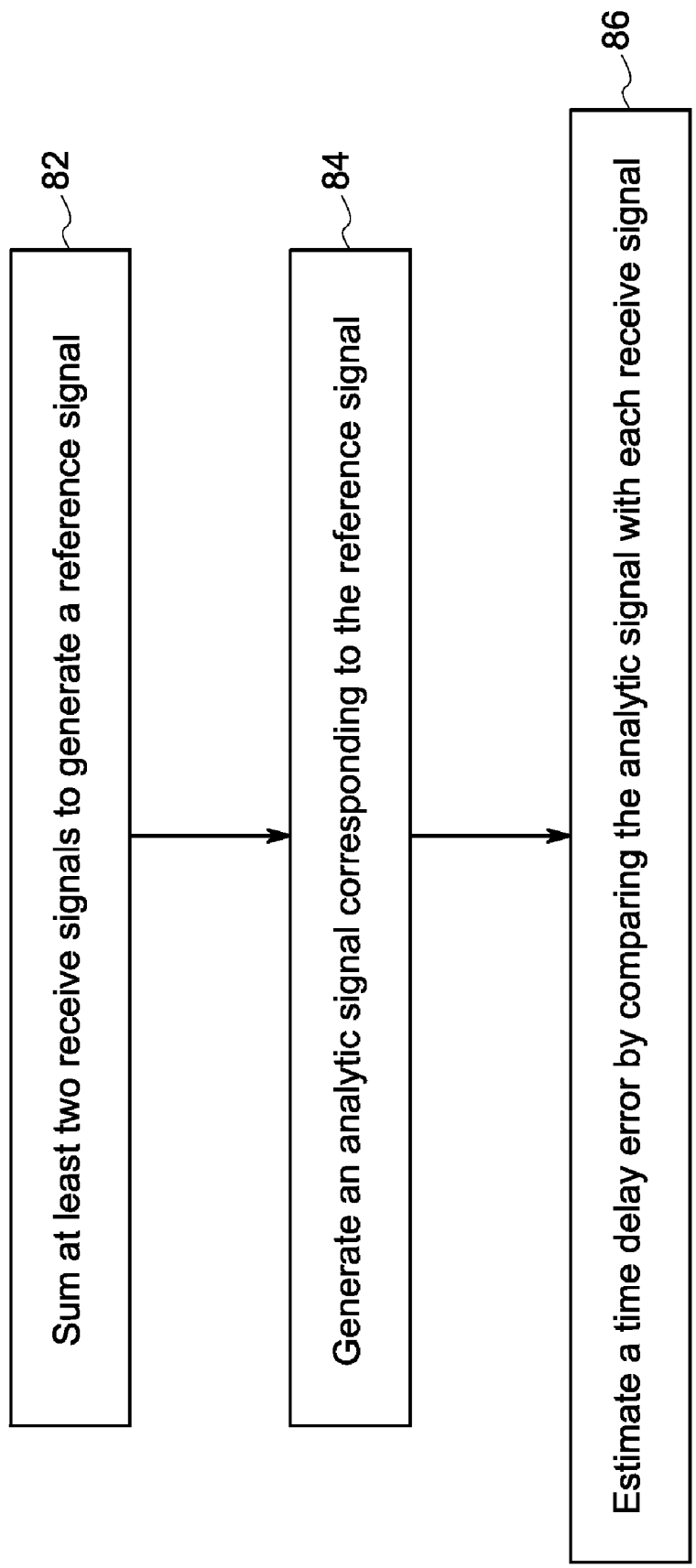
FIG. 4 is a flow chart illustrating one method by which a time delay error can be estimated in ultrasound systems.

FIG. 4 is a flow chart illustrating correcting a time delay between at least two receive signals acquired in an ultrasound system. The corrected time delays in ultrasound systems are used to generate accurate images. Each step in the flow chart is described in further detail below.

In step 82, at least two receive signals received from an array of transducer elements and are summed to form a reference signal. In step 84, an analytic signal is generated corresponding to the reference signal.

In step 86, the time delay error for each receive signal is estimated by comparing the analytical signal and the corresponding receive signal. In one embodiment, a correlation sum using the analytic signal and the real signal is calculated to estimate the time delay error. The correlation sum can be calculated using equation 5 as described with reference to FIG. 2.

The correlation sum is used for correcting the time delay errors in a beamformer system in the ultrasound system. In one embodiment, the time delay error is estimated by calculating a phase of the correlation sum. In a more specific embodiment the phase of the correlation sum is multiplied by a scale factor to estimate the time delay error. In one embodiment, the phase is multiplied by a scale factor, $2\pi/f_0$, where $f_0$ is the approximate center frequency of the ultrasound signals.

In a further embodiment, the amplitude of each range sample for a receive signal is calculated and compared to a threshold value. In one embodiment, the threshold value is calculated by multiplying the average channel signal amplitude by a user-specified factor. In another embodiment, the threshold value is calculated by multiplying the average beamsummed signal amplitude by a user-specified factor. The receive signal is then scaled to a lower value when the amplitude is greater than the threshold value before it is multiplied by the reference signal in the correlator. This rescaling of large amplitude samples reduces the influence of strongly reflecting scatterers to the phase of the correlation sum.

The above described invention provides several advantages including converting only the beamsum signal to a complex form as opposed to converting both the beamsum and receive signals to complex forms. Thus only one conversion filter is needed in the system, instead of one conversion filter for each channel in the system. Since modern ultrasound systems typically have 128 channels or more, such an implementation results in considerable savings in complexity and cost. Furthermore the beamsum signal is in an analytic signal form and not frequency-shifted to produce the baseband form.

Furthermore the circuitry required to calculate the correlation sum can easily be incorporated into the beamforming delay ASIC with little additional cost as it merely requires multiplying a real signal by a complex signal (and accumulating the complex product) as compared with the prior art method which requires multiplying two complex signals (and accumulating the complex product). Incorporating the correlation processor into the receive beamforming ASIC requires routing the beamsum signal to each beamforming ASIC but it eliminates the need to route every receive signal to an external processor. Thus very little extra system bandwidth is required to calculate the arrival time errors substantially reducing the cost and complexity of the system.

In addition, the size of the circuitry required to calculate the correlation sum is reduced because the number of bits in the beamsum reference signal and the receive signal is reduced.

Thus, the size of the multiplier circuitry as well as the size of the summation circuitry is minimized. In addition, the system bandwidth required to route the beamsum reference signal to the correlation processors in the receive beamforming ASICs is substantially decreased. For relatively uniform scatter, such as are found in the liver, the phase of the correlation sum is usually insensitive to the number of bits used for the two signals. The two signals need not have the same number of bits. For example, in one embodiment, sixteen bits may be used for the receive signal while only eight bits may be used for the beamsum reference signal. Many other combinations are possible, each of which trade off circuit size for accuracy in the correlation sum. For example, in another embodiment, only one bit may used for the receive signal, representing the sign of the receive signal, which means that the multiplier circuitry in the correlation processor can be replaced by adders.

As described earlier, the number of bits in the receive signal and/or the beamsum reference signal may be reduced based on a complexity and accuracy of the correlator processor. It is well-known that the amplitude of reflected ultrasound signals tend to decrease with increasing depth. When the summation limits of the correlation sum spans a large range of samples, and when a small number of bits are kept for the receive signal and/or the beamsum signal, the attenuation can cause large quantization errors in the reference signal at large depths if the static gain of the reference or receive signal is set to produce amplitudes near full scale at shallow depths. Alternatively, if the static gain of the reference or receive signal is increased to avoid large quantization errors at large depths, the reduced bit signal can overflow at shallow depths. Even when the overflow or quantization errors are not significant, the signal attenuation tends to weight the samples in the correlation sum from shallow depths more heavily than samples from deeper depths, which may be undesirable.

In one embodiment, time-gain-compensation (TGC) is applied to the reference or receive signal or both before reducing the number of bits sent to the correlation processor. Applying TGC to the one or both signals before reducing the number of bits helps to minimize large quantization errors and helps to produce equal weighting of the contribution of samples to the correlation sum. As part of the TGC circuitry for the beamsum reference, large amplitude samples in the reference can be reduced in amplitude or even set to zero, to minimize the possibility of the phase of the correlation sum being dominated by a small number of large amplitude samples in the reference signal.

Furthermore, by reducing the amplitude of large-amplitude receive signals in the correlation sum, biased and incorrect time delay estimates are minimized which could otherwise introduce image artifacts.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for correcting beamforming time delays between at least two receive signals acquired in an ultrasound system, the method comprising:
    acquiring with an ultrasound transducer at least two receive signals;
    summing the at least two real receive signals received by transducer elements in the ultrasound system to form a reference signal using a summer;
    transforming the reference signal into a complex analytic signal using a complex filter;
    estimating a time delay error for each real receive signal by comparing the complex analytic signal and the corresponding real receive signal using a correlator processor; and
    correcting the beamforming time delays using the estimated time delay errors to generate an enhanced image.

2. The method of claim 1, wherein the estimating step further comprises calculating a correlation sum for each receive signal using the correlator processor, and wherein the correlation sum is calculated based on the equation $$C = \sum_{i=i_o}^{i_1} S_{AO}^*[i] S_1[i]$$

where C represents the correlation sum, $S_{AO}^*[i]$ represents the complex conjugate of the analytic signal at time sample i, and $S_1[i]$ represents the real signal at the time sample i.

3. The method of claim 2, wherein the correlation sum is calculated over a number of time samples using the correlator processor, and wherein the number of time samples is based on a center frequency and a sampling frequency of each of the receive signals.

4. The method of claim 1, wherein the estimating step further comprises calculating a phase of the correlation sum using the correlator processor and utilizing the phase of the correlation sum to estimate the time delay error.

5. The method of claim 4, further comprising multiplying the phase of the correlation sum by a scale factor to estimate the time delay error using the correlator processor.

6. The method of claim 1, further comprising:
    calculating an amplitude at each time sample for each receive signal using a beamformer processor;
    comparing the amplitude at each time sample for each receive signal with a threshold value using the beamformer processor; and
    modifying each receive signal at each time sample when the amplitude is greater than the threshold value by reducing the receive signal amplitude while maintaining a polarity of the receive signal using the beamformer processor.

7. The method of claim 1, further comprising delaying each of the receive signals to align with the reference signal using one or more time delay elements.

8. The method of claim 1, further comprising reducing a number of bits in the reference signal based on a complexity and an accuracy of a correlator processor using the correlator processor.

9. The method of claim 1, further comprising reducing a number of bits in the receive signal based on a complexity and an accuracy of a correlator processor using the correlator processor.

10. An ultrasound system for estimating beamforming time delay, the ultrasound system comprising:
    a transducer array having a set of array elements disposed in a pattern, each of the elements being separately operable to produce a pulse of ultrasound energy during a transmission mode and to produce an echo signal in response to vibratory energy impinging an imaging object during a receive mode;
    a transmitter coupled to the transducer array and being operable during the transmission mode to apply a separate transmit signal pulse with a respective transmitter time delay to each of the array elements such that a directed transmit beam is produced;

a receiver coupled to the transducer array and being operable during the receive mode to sample the echo signal produced by each of the array elements as the vibratory energy impinges the imaging object to generate a corresponding plurality of sampled receive signals;

a beamformer processor comprising:

one or more time delay elements coupled to the receiver and configured to impose a time delay on each sampled receive signal to generate a corresponding plurality of delayed receive signals;

a summer coupled to the one or more time delay elements and configured to sum at least two delayed receive signals to generate a beamsum signal, wherein each of the delayed receive signals comprises a corresponding receiver time delay;

a complex filter coupled to the summer and configured to transform the beamsum signal to a complex analytic signal; and a plurality of correlator processors each coupled to at least one respective transducer array element and the complex filter, wherein each correlator processor is configured to estimate a time delay error by comparing the complex analytic signal from the complex filter and a delayed receive, and wherein the beamformer processor is configured to correct the beamforming time delays for each transducer array element corresponding to each of the receive signals.

11. The ultrasound system of claim 10, wherein the correlator processor is configured to estimate the time delay error by calculating a correlation sum, and wherein the correlator processor is adapted to estimate the corresponding time delay using the correlation sum.

12. The ultrasound system of claim 10, wherein the beamformer processor is configured to calculate a phase of the correlation sum, and wherein the phase is used to estimate the time delay error.

13. The ultrasound system of claim 10, wherein the beamformer processor is configured to calculate an amplitude of each sample corresponding to each receive signal, and the sum of the amplitudes of the receive signals for a set of samples.

14. The ultrasound system of claim 13, wherein the beamformer processor is further configured to compare the amplitude of a receive signal to a threshold value, and scale the receive signal to a lower value when the amplitude of the receive signal is greater than the threshold value.

15. The ultrasound system of claim 14, wherein the beamformer processor is configured to scale the receive signal to a lower value of zero when the amplitude of the receive signal is greater than the threshold value.

16. The ultrasound system of claim 14, wherein the beamformer processor is configured to calculate the threshold value by multiplying an average channel signal amplitude by a user-specified factor.

17. The ultrasound system of claim 14, wherein the beamformer processor is configured to calculate the threshold value by multiplying an average beamsum signal amplitude by a user-specified factor.

18. The ultrasound system of claim 10, wherein a correlation sum is calculated by the correlator processor based on the equation given by $$C = \sum_{i=i_o}^{i_1} S_{AO}^*[i] S_1[i]$$

where C represents the correlation sum, $S_{AO}^*[i]$ represents the complex conjugate of the analytic signal, and $S_1[i]$ represents the real signal and i represents a time sample.

19. The ultrasound system of claim 18, wherein the correlator processor is configured to calculate the correlation sum over a number of time samples, and wherein the number of time samples is based on a center frequency of the receive signal.

20. The ultrasound system of claim 10, wherein the beamformer processor is configured to delay the receive signal to align with the beamsum signal.

21. The ultrasound system of claim 10, wherein the correlator processor is configured to reduce a number of bits in the beamsum signal based on a complexity and an accuracy of the correlator processor.

22. The ultrasound system of claim 10, wherein the correlator processor is configured to reduce a number of bits in the receive signal based on a complexity and an accuracy of the correlator processor.

* * * * *

UNITED STATES PATENT AND TRADEMARK OFFICE
CERTIFICATE OF CORRECTION

PATENT NO. : 7,740,583 B2  Page 1 of 1
APPLICATION NO. : 10/882910
DATED : June 22, 2010
INVENTOR(S) : Rigby et al.

It is certified that error appears in the above-identified patent and that said Letters Patent is hereby corrected as shown below:

In Fig. 1, Sheet 1 of 4, for Tag "36", in Line 1, delete "Disply" and insert -- Display --, therefor.

In Column 6, Line 25, delete "interlace" and insert -- interface --, therefor.

In Column 7, Line 33, delete "i0 to i1," and insert -- $i_0$ to $i_1$, --, therefor.

In Column 8, Lines 1-2, delete "2π/f0, where f0" and insert -- $2\pi/f_0$, where $f_0$ --, therefor.

In Column 8, Line 10, after "elements" delete "and".

In Column 11, Line 27, delete "receive," and insert -- receive signal, --, therefor.

Signed and Sealed this

Third Day of August, 2010

David J. Kappos
*Director of the United States Patent and Trademark Office*